Jan. 17, 1933. V. G. APPLE 1,894,723
ARMATURE
Filed Feb. 5, 1930   3 Sheets-Sheet 1

INVENTOR
Vincent G. Apple

Jan. 17, 1933.  V. G. APPLE  1,894,723
ARMATURE
Filed Feb. 5, 1930   3 Sheets-Sheet 2
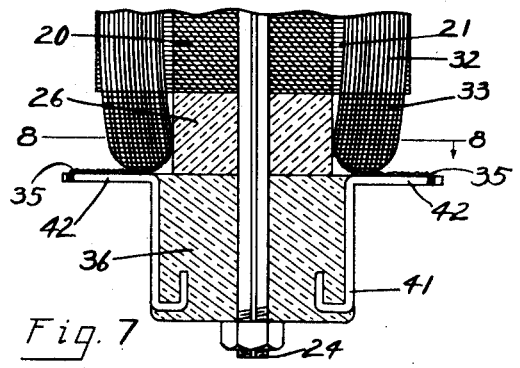
Fig. 7
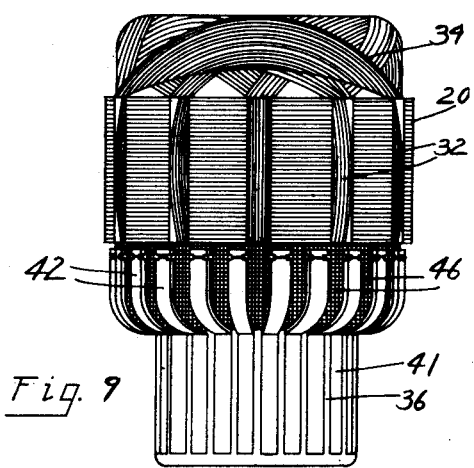
Fig. 9
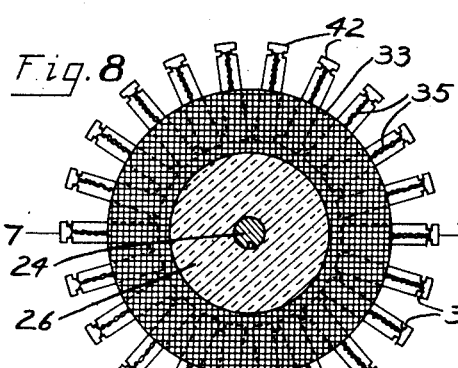
Fig. 8
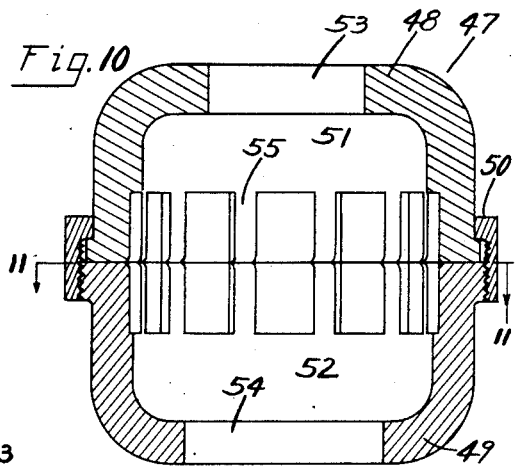
Fig. 10
Fig. 11
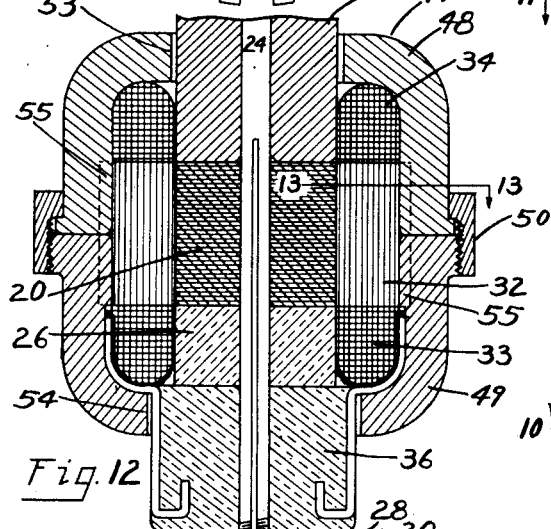
Fig. 12
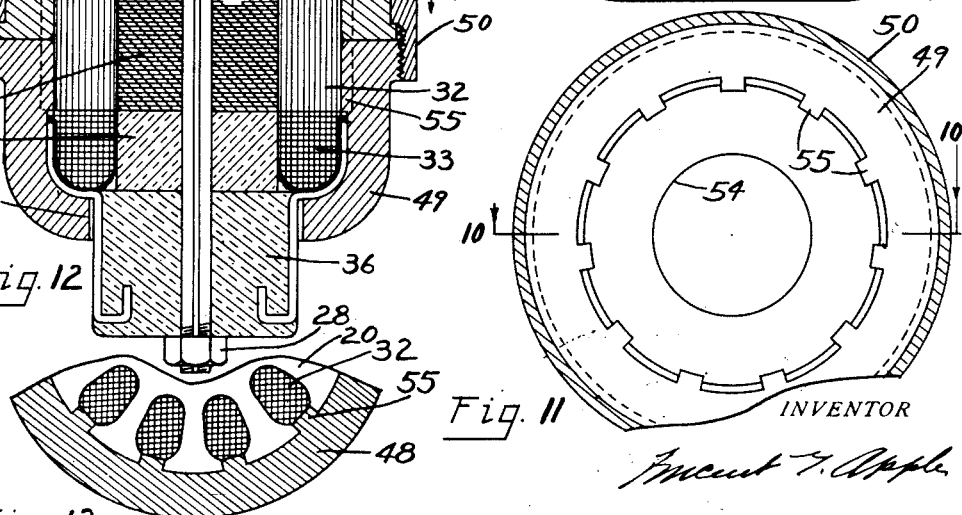
Fig. 13
INVENTOR
Vincent G. Apple Jan. 17, 1933. V. G. APPLE 1,894,723
ARMATURE
Filed Feb. 5, 1930 3 Sheets-Sheet 3

INVENTOR

Patented Jan. 17, 1933

1,894,723

UNITED STATES PATENT OFFICE

VINCENT G. APPLE, OF DAYTON, OHIO; HERBERT F. APPLE, EDWARD M. APPLE AND GOURLEY DARROCH EXECUTORS OF SAID VINCENT G. APPLE, DECEASED

ARMATURE

Application filed February 5, 1930. Serial No. 426,176.

This invention relates to armatures for dynamo electric machines and particularly to armatures having a wire winding embedded and encased in a jacket of molded insulation.

An object of the invention is to generally improve an armature of this type.

Another object is to formulate a procedure particularly adapted to produce an armature of this type.

A specific object of the invention is to wind coils of insulation treated wire on the core, while the wire is yet pliable, then shape the mass of wire concentric to the armature axis and harden it in this shape, in order that a better running balance may be maintained.

Another specific object of the invention is to so proportion, arrange and treat the conductive elements of the structure as to facilitate the application of the insulation jacket thereto.

Another specific object is to so cement together the core, the coils and the commutator as to make of them a self supporting structure which does not depend on the armature shaft for axial alignment of the parts, to the end that the shaft may be removed or renewed at will.

Further and still more specific objects will be apparent to those skilled in the art as the invention is described in detail and reference made to the drawings in which—

Fig. 7 is an axial section taken at 7—7 of Fig. 8 to show how the leads, brought from the inner sides of the coils, extend along the segment risers to their outer ends where they are connected thereto.

Fig. 8 is a transverse section taken at 8—8 of Fig. 7.

Fig. 9 shows how the segment risers are bent down to their final position to cover the leads.

Fig. 10 is an axial sectional view through an envelope within which the wound structure Fig. 7 is shaped and hardened.

Fig. 11 is a transverse section taken at 11—11 of Fig. 10.

Fig. 12 is an axial section through the envelope Fig. 10 with the armature in position.

Fig. 13 is a transverse section taken at 13—13 of Fig. 12.

Similar numerals refer to similar parts throughout the several views.

To successfully mold a jacket of plastic insulation around a structure containing a fine wire winding, the existence of several conditions is more or less essential.

First, the turns of the winding should be surrounded with an adhesive insulating material which may be hardened so as to make the coils about which the jacket is afterward to be molded as rigid as possible, so that very little relative shifting between adjacent turns of the coils may take place when the pressure incident to molding the jacket is applied.

Second, the adhesive insulating material should be so thoroughly applied to the turns of the winding that a considerable layer of it extends between all adjacent turns, and between the turns and the core, so that, when the jacket is being molded, should slight relative shifting take place between adjacent wires, or between wires and the core, the layer of insulation therebetween may not be broken down to permit shorting between turns or grounding to the core.

Third, the said adhesive insulating material should be of such high quality and of such a nature that it may not be forced by pressure from between two wires or other surfaces once a suitable layer has been placed therebetween and hardened.

Fourth, it is highly important that no fine wire leads should extend unsupported across open spaces, from the general mass of the hardened coils to spaced apart terminals such as commutator bars, etc., because the plastic material afterward molded about the coils to form the jacket may tear away such unsupported leads when it moves past and around them during the molding operation.

The structure and the procedure hereinafter described attain the objects of the invention by meeting the foregoing conditions.

Figure 1:
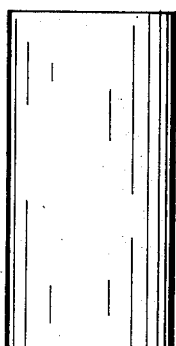
- Fig. 1 shows a plurality of laminæ assembled on a mandrel to compose a core.

The core 20 Fig. 1 having winding apertures 21 separated by teeth 22 is composed of a plurality of laminæ 23 compacted upon the stem 24 of mandrel 25 and held compacted by insulation collar 26, metal collar 27, and nut 28. A keyway 29 in stem 24 is entered by corresponding integral keys 30 in laminæ 23, whereby alignment of the winding apertures of one lamina with another is maintained.

Before a winding is placed in apertures 21 they should be lined with insulation, preferably by applying a heavy coating of liquid insulation to the inside of the apertures and hardening it, though the apertures may be insulated by lining them with fishpaper or the like in the usual manner. The mandrel 25 remains in the core until the armature is completed.

In order to surround the turns of the wire of the armature coils with a suitable layer of adhesive insulation, which may be afterward hardened to provide rigid coils, the procedure described in my copending application Serial No. 356,586, filed April 19th, 1929 is preferably adopted. This procedure consists essentially of drawing wire which already has a coating of fibrous or other absorptive insulation through a receptacle containing the adhesive insulation in liquid form, passing the wire through a die as it emerges from the receptacle to determine the thickness of the coating, partly drying it so as to reduce its viscosity sufficiently to permit it to be wound into coils and placed on the core and finally hardening the coils on the core.

But while the foregoing method of getting insulation into the coils is much preferred, the older method of winding them first and afterward impregnating them, may be employed as a step in carrying out this invention when combined with other novel features disclosed.

Figure 3:
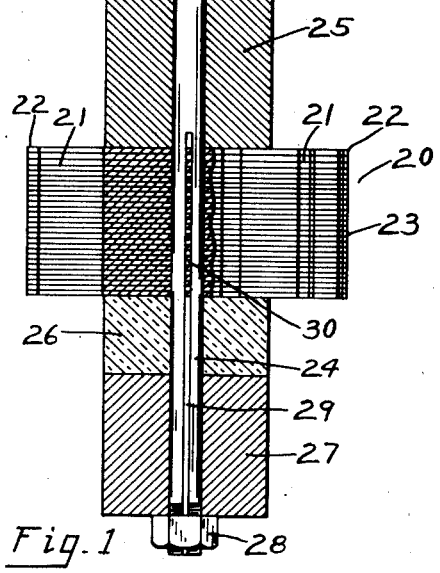
Fig. 3 is a section taken on the line 3—3 of Fig. 2.
Figure 2:
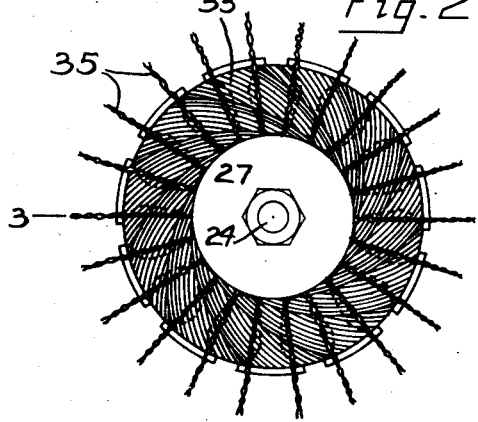
Fig. 2 is an end view of the core after it is wound, and leads are brought out radially from the inner sides of the coils.

Figs. 2 and 3 show the wound structure 31 comprising the core 20 with coils 32 in apertures 21 and coil heads 33 and 34 extending beyond the core. There are two coils per aperture and a lead 35 composed of two coil ends twisted together is brought out from the inner side of each coil where it rests against insulation collar 26 and is extended radially outward as shown.

To make a suitable commutator 36 a procedure similar to that shown and described and claimed in my copending application Serial No. 363,460, filed May 16th, 1929, may profitably be adopted, although other means may be employed if desired. This procedure consists essentially in providing commutator segments with risers, providing a mold with pockets to fit the risers, clamping the risers of the segments in the mold pockets to hold the brush track parts of the segments spaced apart, and molding a core of insulation between and about the segments to compose a commutator.

Figure 5:
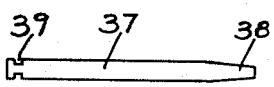
Fig. 5 is an outline of a sheet metal blank used to make a commutator segment.
Figure 6:
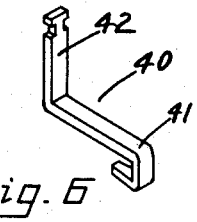
Fig. 6 shows a commutator segment made from a blank Fig. 5.

Blanks 37, Fig. 5, cut from conductive material of suitable thickness are pointed as at 38 and notched as at 39. Commutator segments 40 are then made by bending at right angles to provide a brush track portion 41 and a riser 42 with the pointed ends 38 turned under as shown in Fig. 6.

Figure 4:
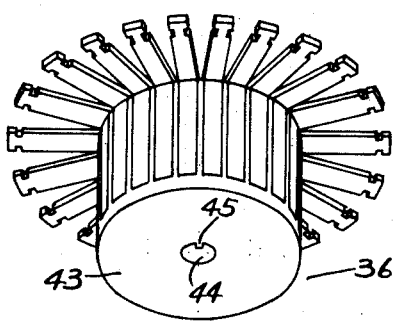
Fig. 4 is a perspective view of a completed commutator.

Fig. 4 shows the commutator made by binding together the proper number of segments 40 with the core 43 of insulation. Core 43 has an axial opening 44 and integral key 45 of substantially the same dimensions as the corresponding openings and keys in the core laminæ 23. Core 43 extends outwardly between the segments to the brush track and for that reason should preferably be composed of a material which will not carbonize under the arcing of the brushes.

Having provided the wound structure 31 and the commutator 36, the nut 28 and the metal collar 27 are removed from the stem 24 and the commutator put on the stem in place of the collar, then the nut is returned to hold the commutator in place.

Figs. 7 and 8 show how the leads 35 extend radially between the coil head 33 and the risers 42 to their outer ends where they are wound around the ends of the risers in the grooves 39 and soldered, welded or otherwise joined. When soldering is the method selected the height of the risers permits their outer ends to be dipped in a pot of molten solder without danger of getting any of the solder into the winding.

After the leads are all laid along the sides of the risers and connected as shown in Figs. 7 and 8, a layer of treated tape 46 may be laid over coil head 33, and the risers 42 bent down upon the coil head with tape 46 between, as shown in Fig. 9.

Inasmuch as the insulation treated winding is preferably baked to harden it before the jacket of plastic insulation is molded there-about, a number of advantages may be gained by holding the winding in a definite shape while it is being hardened, first, because, by drawing the coils and coil heads into circular form concentric with the axis of rotation and so hardening them, a better mechanical balance may be had and the jacket over them will be of more uniform thickness, and second, because, if the jacket is to be molded around both coil heads at a single operation, passages whereby the plastic insulation may pass from one end of the core to the other must be provided. Such passages are preferably provided by keeping vacant a portion of each winding aperture 21 at its outer edge.

The envelope 47, Figs. 10 and 11 is made in two halves 48 and 49 held tightly by nut 50 and has cupped ends 51 and 52, an opening 53 for mandrel 25 to extend through, an opening 54 for commutator 36 to extend through, and a series of inwardly extending keys 55 to enter the outer edges of apertures 21 to press the coils inwardly and compact them more closely into the bottom of the apertures and thereby leave spaces at the outer edges of the apertures after the coils are hardened.

Figs. 12 and 13 show the armature in the envelope, and it is readily seen how keys 55 keep the coils 32 down in the apertures and how cupped ends 51 and 52 keep the coil heads to concentric shape while the armature is being hardened.

When the armature has been baked for a suitable period in envelope 47, it is removed and placed in mold 56. Mold 56 comprises a base 57, a body 58 and a plunger 59. Base 57 is bored at 60 to clear the nut 28 and counterbored at 61 to receive the commutator 36 and is held concentric with body 58 by annular rib 62. Body 58 is bored smoothly at the lower end as at 63 to a diameter adapted to receive the commutator 36, next above this at 64 to a diameter sufficiently larger than the coil head 33 to admit a layer of plastic insulation which is to form the jacket around it, next above this to a smooth diameter 65 which will admit the core 20 to the shoulder 66, and at the upper part to a smooth diameter 67 capable of receiving the plunger 59. Plunger 59 is bored at its lower end at 68 to form the jacket around coil head 34 and for the remainder of its length as at 69 to fit the mandrel 25.

Figure 14:
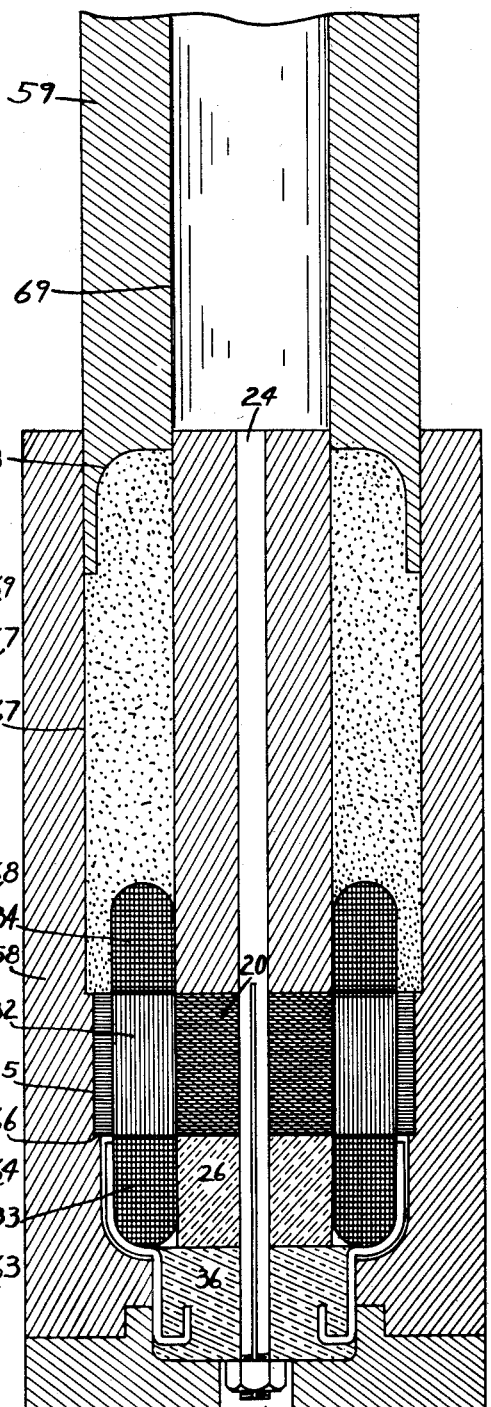
Fig. 14 is an axial section through a mold adapted to apply the jacket of molded insulation, the wound armature being in place with the proper quantity of unmolded compound, ready to be fluxed and compressed into a layer around the winding.

In operation the armature is placed in the mold 56 with the core 20 resting on the shoulder 66. The assembled mold and armature and the plunger 59 are then brought to a relatively high temperature and so held until the temperature is uniformly distributed throughout the mass. A measured quantity of loose molding compound is then put in the opening 67 around the coil head 34 and mandrel 25 and the plunger 59 is entered above the compound as shown in Fig. 14.

Figure 15:
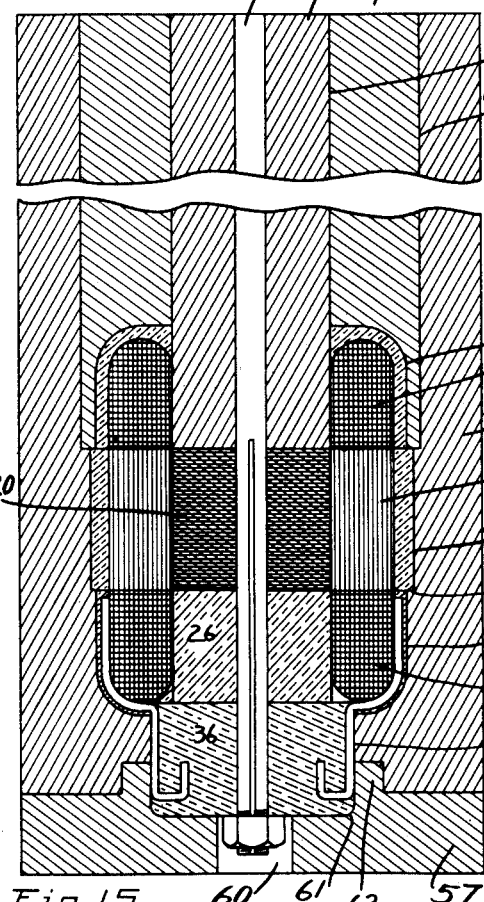
Fig. 15 is an axial section through the mold after the insulation jacket is pressed about the winding.

Pressure from any suitable source is now put on plunger 59 and maintained until the compound absorbs sufficient heat from the mold, plunger, and core to flux it, whereupon the applied pressure will force the plunger downward, pressing the fluid insulation around coil head 34, downwardly through the outer portions of winding apertures 21 which were left vacant by the keys 55 when envelope 47 was removed, and farther downward around coil head 33 surrounding and covering the bent over risers 42 (see Fig. 15).

Figure 16:
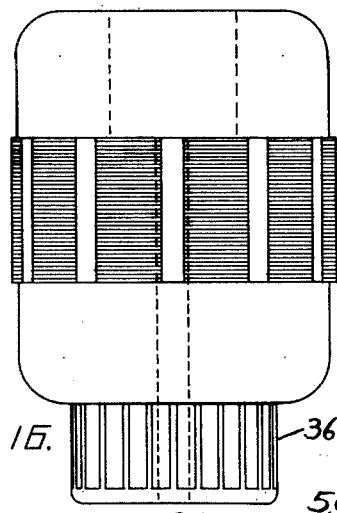
Fig. 16 shows the completed armature.

When the mold has been held closed as in Fig. 15 for a sufficient length of time to permit the heat of the mold to harden the jacket of insulation the armature is removed from the mold and the mandrel 25 is removed from the armature, whereupon the armature appears as in Fig. 16.

From a consideration of the foregoing description and the drawings the following advantages of the invention not heretofore attained, will be apparent.

First, bringing the leads out at the inside of the coils and radially outward between the coils and the segment risers, and bending the risers over upon the leads to cover them, permits a jacket of insulation to be molded over them without danger of breaking the leads from the coils or from the risers.

Second, making the segment risers extend outwardly beyond the armature diameter, joining the leads to the outer ends, dipping the said outer ends into a solder pot without getting the core, coils, or commutator in the solder, then bending the leads down to bring them to a diameter smaller than the armature, facilitates the soldering operation.

Third, hardening the coils in an envelope of the character shown and described brings their mass to more concentric relation with the axis of rotation of the armature, and insures a better running balance.

Fourth, providing internal keys in the envelope which extend into the outer parts of the winding apertures while the coils are being hardened, insures free passage of plastic compound from one end of the core to the other when the jacket is being molded around the coils.

Fifth, the same ring of insulation which forms a jacket over the front coil head also holds the inner ends of the commutator segments against radial outward movement from centrifugal force by surrounding the segment risers.

And sixth, the same said ring of insulation which forms a jacket over the front coil head and surrounds the segment risers, joins the commutator and the armature together and holds them in axial alignment, so that these two members need not depend on the armature shaft to perform this function, as in common practice.

Believing that the foregoing advantages are separately and collectively new and useful,

I claim,

1. A dynamo electric machine armature comprising a magnetizable core, a winding comprising a plurality of turns of insulated wire on said core extending beyond and forming winding heads at the ends of said core, a commutator hub of insulation in coaxial alignment with said core axially beyond the front winding head, a plurality of metal commutator segments circumferentially spaced apart around said hub, the one end only of each segment being imbedded in said hub, the other end being extended beyond said hub toward said core and joined to said winding, and a concentrically molded ring of insulating cement extending from said core to said hub, cementing said core to said hub, the said front winding head and the said extended ends of said segments and the joints between said segments and said winding all being imbedded in said ring.

2. An armature such as defined in claim 1 wherein the one end of each segment extends first inwardly then axially toward the core and the other end extends first outwardly then axially toward the core, the inturned ends being imbedded in said hub and the outturned ends being imbedded in said ring.

3. An armature such as is defined in claim 1 wherein the said ring extends around the end of the said hub to bind said hub and ring together and maintain their axial alignment.

4. An armature such as is defined in claim 1 wherein the said ring constitutes the sole means of maintaining coaxial alignment of said commutator and said core and of preventing relative axial movement between them.

In testimony whereof I affix my signature.

VINCENT G. APPLE.